R. W. CANFIELD.
APPARATUS FOR WORKING GLASS.
APPLICATION FILED JULY 26, 1915.
1,203,099.
Patented Oct. 31, 1916.
2 SHEETS—SHEET 1.
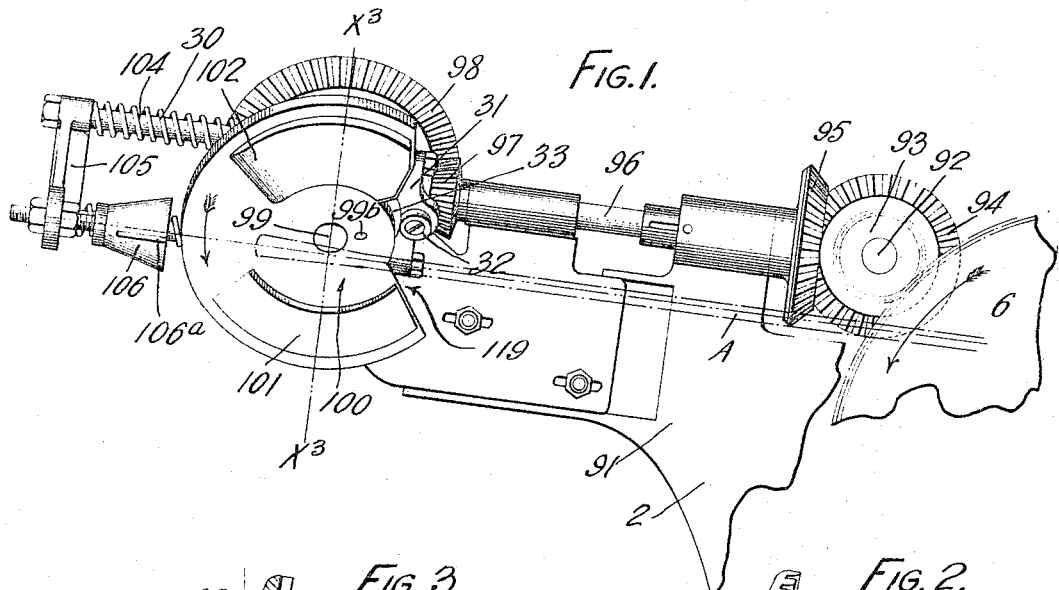
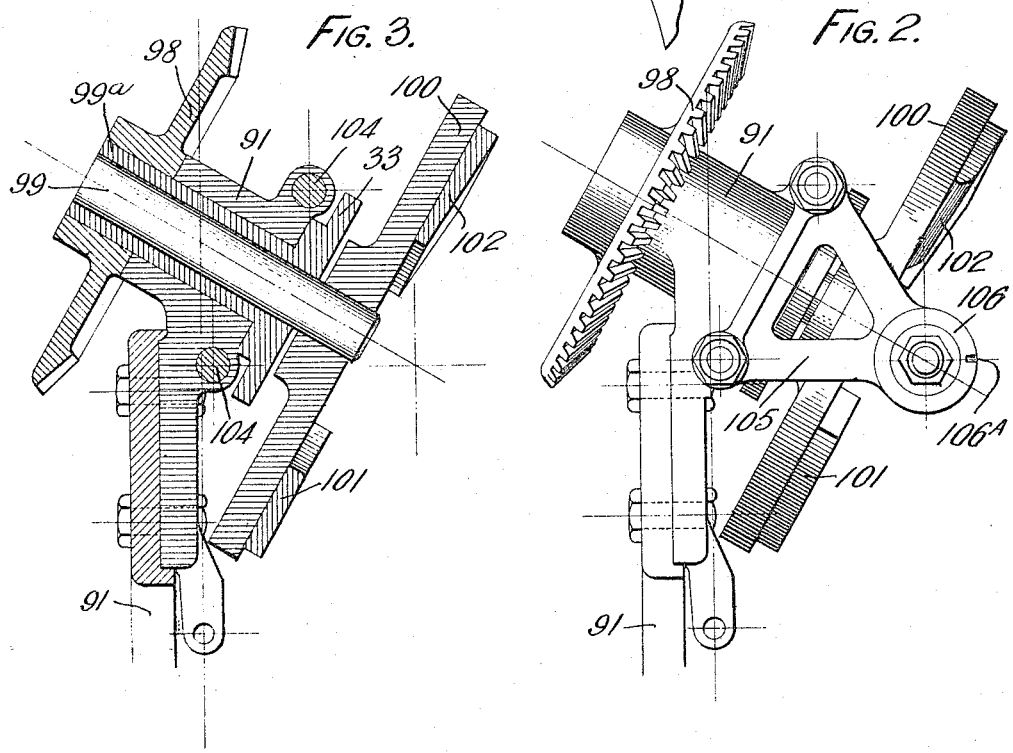

R. W. CANFIELD.
APPARATUS FOR WORKING GLASS.
APPLICATION FILED JULY 26, 1915.
1,203,099.
Patented Oct. 31, 1916.
2 SHEETS—SHEET 2.
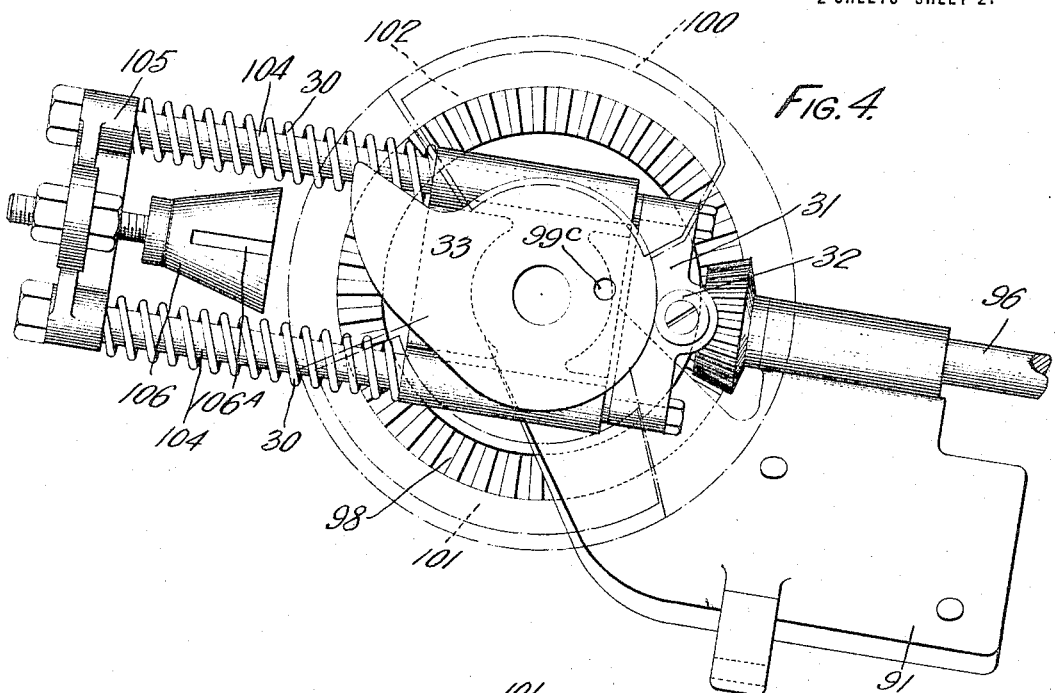
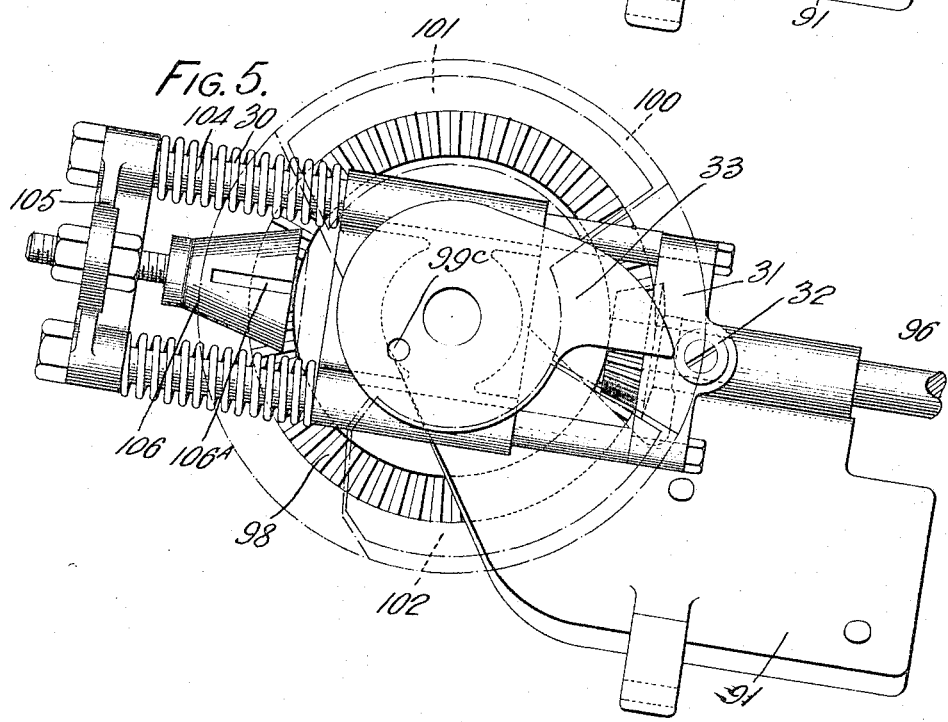

UNITED STATES PATENT OFFICE.

ROBERT W. CANFIELD, OF CORNING, NEW YORK, ASSIGNOR TO EMPIRE MACHINE COMPANY, OF PORTLAND, MAINE, A CORPORATION OF MAINE.

APPARATUS FOR WORKING GLASS.

1,203,099.     Specification of Letters Patent.     Patented Oct. 31, 1916.

Application filed July 26, 1915. Serial No. 41,913.

*To all whom it may concern:*

Be it known that I, ROBERT W. CANFIELD, a citizen of the United States of America, and a resident of Corning, New York, have invented certain new and useful Improvements in Apparatus for Working Glass, of which the following is a specification.

In an application filed February 1, 1912, by Benjamin D. Chamberlin, and serially numbered 674,814 is described and claimed a process for forming blanks upon gathering irons which consists in fixing a solid batch of glass upon an iron with a part of the glass projecting beyond the end thereof, and subsequently pressing the solid glass rearwardly on the iron while limiting its lateral spread until a definite and measured quantity thereof remains beyond the end of the iron, the solid gaged portion of the blank being subsequently blown. In another application filed January 4, 1915 as a division of a prior application, and serially numbered 504, the said Chamberlin describes and claims mechanism for carrying out the process above named, such mechanism consisting of a gage-mold adapted to be projected upon the glass intermediate of the action of a marverer thereon.

My present application relates to improvements on the inventions described and claimed in the said Chamberlin applications, and to a form thereof in which the gaging action is produced by the movement of a gage-cup which is slowly moved back upon the projecting glass upon the iron, and thus causes a relatively slow flow of such glass, whereas the specific embodiment shown in the said Chamberlin applications involve a quick movement of the marverer, and only a momentary inclusion of the glass therein. While the specific embodiment shown by Chamberlin is thoroughly operative, it suffers from the defect that the quick action of the marverer sometimes plugs the end of the blow-pipe, and thus causes imperfect blowing, although when this does not occur, the finished articles are satisfactory. By slowly moving the gage-cup upon the blank, I find that the percentage of blanks which plug the ends of the blow irons are reduced.

This invention therefore consists in a method of and apparatus for gaging the blanks differing from the specific embodiment of the Chamberlin mechanism in the particulars before described, and in certain details of construction as will be hereinafter more fully described and claimed.

Referring to the accompanying drawings, in which corresponding parts are designated by corresponding marks of reference,—Figure 1 is a front elevation of a blank-shaping mechanism in accordance with this invention. Fig. 2 is an end elevation thereof. Fig. 3 is a vertical section on lines $X^3$—$X^3$ of Fig. 1. Fig. 4 is a front elevation of the blank-shaping mechanism, the marverer being shown in dotted lines, and the parts being in normal position and shown as projected on a plane parallel to the plane of rotation of the marverer disk. Fig. 5 is a similar view, but showing the parts in the position they assume at the time of cupping.

Inasmuch as this invention is adapted for use with a machine of the general character shown in the patent to Chamberlin, No. 1,124,702, dated Jan. 12, 1915, the general details of that machine will not be illustrated, Fig. 1 of this application being a view similar to Fig. 13 of the said Chamberlin patent. It will be presumed, therefore, that the toothed disk 6 is driven intermittently from a main drive shaft, the construction being such that the disk will be driven through a certain angular movement, then arrested, and then again put in movement to complete its full rotation, for each article to be produced. It will be further presumed that a suitable blow-pipe frame such as shown in the said Chamberlin patent, is provided and is adapted when moved by the rotation of the disk 6 to oscillate in a vertical plane around an axis concentric to that of the rotation of the disk, so that when the parts are in normal position, the blow-pipe will removably hold the blow-pipe frame substantially horizontal, and that it will, during the movement of the disk 6, first be swung in a direction reverse to that of the rotation of the disk, as shown by the arrow in Fig. 1, to bring the blow-pipe in alinement with a cupper as represented by the dotted lines A; after a rest will be then reversed in its movement, and be swung in the direction of the movement of the disk until vertical, and will, during further movement of the disk be temporarily held in a vertical position; and will then, on further rotation of the disk be given a movement reverse to that of the rotation of the disk and returned to normal position. Some functions accomplished by these movements of the blow-pipe frame will be hereinafter described. For the present, it is sufficient to state that the initial movement of the blow-pipe frame in the direction reverse to that of the movement of the wheel, raises the lower (that is to say the end upon which is the gather of glass) of the blow-pipe slightly above the horizontal position, (which is the normal position of the blow-pipe), and positions the blow-pipe for marvering and cupping of the blank thereon; that the next movement of the blow-pipe, which is in the same direction as the rotation of the disk causes the introduction of blown air into the blank and places the blow-pipe in a vertical position with the blank thereon in proper relation to the mold for molding, and that the temporary arrest of the motion of the blow-pipe frame permits the elongation of the gather and blowing, and that the subsequent movement of the blow-pipe frame in the direction reverse to that of rotation of the disk, restores it to normal position. These movements and the rest at marvering and cupping are all due to the rotation of the disk 6 and are the functions of the rotation thereof.

The upper end of a web standard 2 forming part of the machine before described, carries on one side, a projecting arm 91, on which the blank-shaping device forming the subject-matter of this application is advantageously mounted to be shifted radially in respect to the pivotal point of the blow-pipe frame, such arm being in the rear of the corresponding blow-pipe frame, and the axis of the arm being at an angle above the horizontal. On the head of the web standard 2 is a stud 92 having journaled thereon a pinion 93, meshing with the peripheral teeth of the main disk 6, and having a beveled gear 94 fast thereon and meshing with the corresponding gear 95 on the inner end of a telescopic jack-shaft 96, carried in the upper part of the arm 91. The outer end of the telescopic shaft carries a beveled pinion 97 meshing with a beveled gear 98 on the rear end of a sleeve 99$^a$ journaled in the outer end of the arm 91. The sleeve 99$^a$ is transverse to the arm 91 and inclines downwardly and forwardly, and contains a shaft 99 which carries on its forward end in front of the arm 91, a rotary marverer disk 100 having two crown sectors 101 and 102, which are thicker at their rear ends than at their forward ends, the elevation of the first sector 102 being slightly greater above the plane of the marverer disk on its outside edge than that of the second sector. The first sector is also beveled, having its outer edge thicker than its inner, the sectors being varied in proportion and contour at their various parts to suit the glass worked, and the distribution of glass which they are to accomplish. The marverer is driven by a pin 99$^b$ on the rear face thereof, taking in a recess 99$^c$ in the forward end of the sleeve 99$^a$. The marverer disk is thus rotated during the whole period of rotation of the toothed disk, the ratio of gearing between them being such that the marverer disk is rotated twice to each rotation of the toothed disk.

In the operation of the machine, the initial rotation of the toothed disk lifts the gatherer end of the blow-pipe and positions the blow-pipe parallel to the axial line of the blank-shaping and forming mechanism, the blow-pipe projecting past the axis of the marverer disk, and the blow-pipe frame is arrested in this raised position. When the blow-pipe is so positioned, the marverer disk has moved slightly forward from the position shown in Fig. 1, so that further rotation of the marverer disk will bring the thinner entering edge of the marvered sector 102 past the gatherer end of the blow-pipe, and the continued rotation of the marvered disk causes the face of the sector 102 to pass into contact with the gather on the blow-pipe, which is at this time rotated by mechanism described in the said Chamberlin patent, thereby marvering the gather. Due to the shape of such, the result is first a working the glass rearwardly on the blow-pipe.

A sliding frame, comprising rods 104 is mounted in the end of the arm 91 to move axially and parallel with the axis of the blow-pipe when in its raised position, the rods carrying on their outer end, a head 105, to the forwardly extending end of which is secured a gage mold or cup 106, in the axial line of the blow-pipe when raised, and normally beyond the path of movement of the gather thereon. The cup has an inwardly facing smooth internal cavity of the proper size and shape dependent upon the blank which is to be formed, and the walls of this cup at the forward side thereof are slotted as at 106$^a$, to permit inspection of the action of the blank therein.

Surrounding the rods 104 and between their sliding bearing in the arm 91, and the head 105, are the coiled springs 30, which serve to hold the cup at the outer limits of its play, while the inner ends of the rods 104 inside of their bearings in the arm 91 are connected by the cross head 31, carrying at its center the anti-friction roller 32. A cam 33 is fast on the forward end of the sleeve 99$^a$, and in its rotation, serves to throw the roller 32 inwardly and to thus slowly move the cup inwardly along the axis of the blow-pipe when it is in a raised position, this movement being so timed that it occurs while the blow-pipe is raised, and after the glass thereon has been subjected to the action of the first marverer face 102, the marverer disk being notched at 119 to permit this inward movement of the cup. As soon as the cam moves on past the roller (it having a radial face to permit this), the springs 30 throw the cup to the outer limit of its play and away from the end of the blow-pipe to permit the second marverer face 101 to act upon the gaged blank.

In this mechanism the first cam sector 102 of the marverer is so shaped that after a mass of glass on the blow-pipe has been in contact therewith it will be given the shape of a truncated cone, and the surplus of the gather will be worked back to a greater or less extent upon the blow-pipe and is in this shape when the gage mold 106 is projected thereon. Inasmuch as the cavity of this mold has a definite capacity and as the gage mold in every operation is moved inwardly a uniform distance and to within a fixed distance of the end of the blow-pipe, it follows that any surplus glass over the quantity predetermined by the capacity of the gage mold will be forced back upon the blow-pipe. As that part of the gather which extends beyond the end of the blow-pipe will be distributed to form the finished article, it will be seen that each blank after the gage mold has come in contact therewith, consists of a uniform quantity of material to be utilized in the subsequent manufacture of the finished article. After the momentary shaping by the gage mold, and the retraction thereof, the continued rotation of the marverer disk brings the second sector 101 thereon into contact with the blank, whereby that part of the latter which is to form the finished article is slightly elongated and whereby any imperfections left by the gage mold are eliminated.

It has not been thought necessary to show in detail the shapes and successive forms of blanks produced as before described, for the reason that such shapes are fully shown in the said Chamberlin patent, but it being of course obvious that other desired configurations may be produced. This is the less necessary in that the invention here involved as before stated, consists in a slow movement of the gage-mold onto the blank instead of the rapid movement thereof, and removal thereof from the blank, as is shown in the said Chamberlin applications and patents, and not in the shape of the produced blank itself.

Suitable air-mechanism for blowing the blank formed as above described is carried on the blow-pipe frame, and a suitable mold-mechanism is mounted adjacent the base of the web-standard. Such mechanism may be of the construction and operation of the aforesaid patent to Chamberlin, No. 1,124,702.

Having thus described my invention, what I claim and desire to secure by Letters Patent is:—

1. In a glass-working machine, the combination with a glass-carrying iron, of a non-rotating gage-mold, a marverer, means for slowly moving the gage-mold upon the end of the glass on the iron to a definite distance, means for rotating the iron while the glass thereon is in the gage-mold, means for marvering the glass prior to and after such gaging action, and means for holding the iron pendent subsequent to the last gaging action for the elongation of the glass.

2. In a glass-working machine, the combination with a non-rotating gage-mold, a glass-carrying iron, means for rotating the said iron, means for slowly moving the gage-mold axially on the glass on the end of the iron, and means for marvering the glass before and after the action of the gage mold.

In testimony whereof I hereunto affix my signature in the presence of two witnesses.

ROBERT W. CANFIELD.

Witnesses:
WM. J. HEERMANS,
JOHN L. THOMAS.